United States Patent [19]

McCune et al.

[11] 3,759,442

[45] Sept. 18, 1973

[54] CARD PUNCH SYSTEM AND PROCESS

[75] Inventors: Clarence G. McCune, Balboa; John C. Vincer, Anaheim; Kenneth E. Graves, San Jose, all of Calif.

[73] Assignee: California Computer Products, Inc., Anaheim, Calif.

[22] Filed: Feb. 11, 1972

[21] Appl. No.: 225,685

Related U.S. Application Data

[62] Division of Ser. No. 47,215, June 18, 1970, Pat. No. 3,667,668.

[52] U.S. Cl. .................................................. 234/1
[51] Int. Cl. ............................................ G06k 1/18
[58] Field of Search................ 234/1, 15, 17, 55–58; 340/365

[56] References Cited

UNITED STATES PATENTS

| | | | |
|---|---|---|---|
| 3,167,244 | 1/1965 | Berlinsky et al. | 234/15 |
| 2,781,847 | 2/1957 | Kilheffer et al. | 234/15 |
| 2,755,860 | 7/1956 | Dreher et al. | 234/15 |
| 2,964,743 | 12/1960 | Bange | 234/15 X |

*Primary Examiner*—J. M. Meister
*Attorney*—John A. Duffy

[57] ABSTRACT

The time required to punch IBM cards can be reduced by using a memory for storing a large number of programs. The card reading capability of a conventional keypunch machine can be used to load the program information. The memory can also be used to store keystroke data while the system is executing automatic operations.

3 Claims, 7 Drawing Figures

PATENTED SEP 18 1973 3,759,442

SHEET 1 OF 7

FIG. 3.

PROGRAMMING CODE

| | FIRST COLUMN (BITS 16-13) | | SECOND COLUMN (BITS 12-9) | | BITS 8-5 | BITS 4-1 | THIRD & FOURTH COLUMNS |
|---|---|---|---|---|---|---|---|
| | | MEANING | | MEANING | | | MEANING |
| STANDARD | S | SKIP FIELD } AUTOMATIC | A | ALPHA SHIFT | 0 | 1 | END OF FIELD COLUMN NUMBER |
| | D | DUP FIELD } AUTOMATIC | N | NUMERIC SHIFT | . | . | |
| | M | MANUAL FIELD | | | . | . | |
| | C | CONSTANT FIELD | | ANY CHARACTER INCLUDING SPACE | 8 | 0 | |
| | B | BUFFER CHECK | X | BUFFER CHECK | 0 | 0 | BUFFER CHECK |
| | J | JUMP | 0 | UNCONDITIONALLY | 0 | 0 | PROGRAM NUMBER |
| | | | 1 | FIRST ALTERNATE | . | . | |
| | | | 2 | SECOND ALTERNATE | 2 | 2 | |
| | | | | | P | S | PROGRAM SELECT |
| OPTIONAL | | LEFT-ZERO FIELD | | FIELD SIZE | | | END OF FIELD COLUMN NUMBER |
| | X | ACCUMULATE IN X | 3 | 3 | | | |
| | Y | ACCUMULATE IN Y | 4 | 4 | | | |
| | Z | LEFT ZERO FILL | 5 | 5 | 0 | 3 | |
| | | | 6 | 6 | . | | |
| | | NOTE THE X OR Y INSTRUCTION IMPLIES A Z INSTRUCTION | 7 | 7 | . | | |
| | | | 8 | 8 | . | | |
| | | | 9 | 9 | | | |
| | | | 0 | 10 | | | |
| | | | 1 | 11 | | | |
| | | | 2 | 12 | 8 | 0 | |
| | Ø | OUTPUT | X | ACCUMULATOR X | | | |
| | | | Y | ACCUMULATOR Y | | | |

CARD PUNCH SYSTEM AND PROCESS

This application is a division of application Ser. No. 47,215, filed June 18, 1970, now U.S. Pat. No. 3,667,668.

BACKGROUND OF THE INVENTION

Reference is made to INFORMATION ENTRY SYSTEM, Ser. No. 625,112, filed Mar. 22, 1967, by Kenneth E. Graves, John C. Vincer and Clarence G. McCune, now U.S. Pat. No. 3,597,592.

This invention relates generally to improvements in an information entry system of the type described in the above-referenced patent application, the contents of which are incorporated by reference as background information for the invention described herein.

The basic features of a standard IBM punch machine have been delineated in the aforementioned patent application, the important aspects of which may be described as follows:

1. The standard keypunch machine is capable, upon receipt of certain program instructions, of performing limited automatic operations such as skip and duplication.
   a. During these automatic operations the manual keyboard input to the punch is locked, and errors frequently result from the operator's attempting to "key in" information during one of the automatic operations.
   b. Keypunching time is lost while the operator waits for the machine to carry out the automatic operations.
2. The number of programs which the standard machine can store without modification is limited to the number of programs which can be punched on a single IBM program card. With conventional program formats, this is two programs.
   a. The entry of information from complex documents frequently requires many more programs, so it is necessary to run the complete card deck in more than one batch.

Accordingly, it is a primary object of the present invention to provide a system for reducing the time required to execute a given card punching requirement.

It is another object of the invention to provide a system for decreasing the amount of time required to verify the accuracy of certain punching operations.

It is a further object of the invention to provide an improved method of entering data into a standard card punch machine.

It is another object of the invention to reduce the probability of keystroke errors during automatic card punching operations.

Other objects and advantages of the present invention will be evident from the detailed description of a particular embodiment given hereinbelow.

SUMMARY OF THE INVENTION

The present invention comprises an automatic digital control device for extending the capability of a standard card punch machine or a card punch verifier. The system includes both a keystroke memory and an expanded storage capacity for card format programs. The keystroke memory supplies the stored data to the card punch when the card punch is ready to punch keyed data, thus relieving the operator of cadence requirements created by the need to wait while the system performs automatic operations. The expanded program capability allows the operator to process as many as 22 different card formats without reprogramming. In addition, the operator is relieved of having to physically change program drum cards since program storage is conveniently accomplished by reading the programs into memory using the card punch capabilities.

DESCRIPTION OF THE DRAWINGS

FIG. 2 shows the functional relationship of a preferred group of operative elements for performing the various processes of the invention.

FIG. 3 shows an instruction set for operatin the invention.

DESCRIPTION OF A PREFERRED EMBODIMENT

A standard keypunch machine employs a mechanically rotating drum for holding an IBM card which is prepunched with a sequence of instructions which constitute one or two programs. Whenever it is desired to change the program, the operator must physically change the program card. In the present invention, as many as twenty-two different programs can be stored in a memory. These programs are initially punched on separate IBM cards and the information is entered into memory using the card reading capabilities of the keypunch machine.

Figure 1:
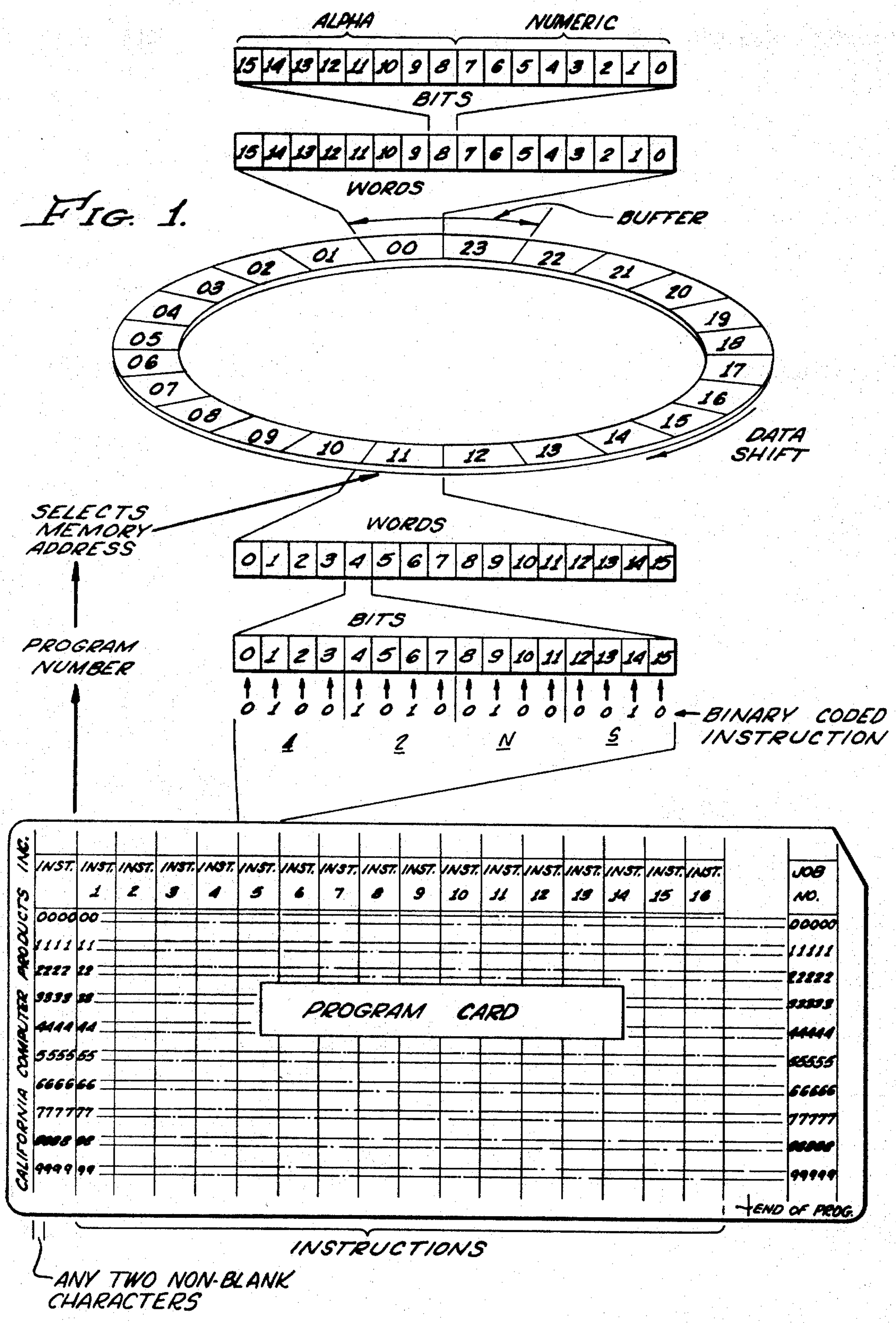
FIG. 1 shows a program card format together with a pictorial representation of the memory organization.

FIG. 1 shows the format of the program card which is utilized in the preferred embodiment of the invention described herein. The first two columns are any non-blank characters and the next two columns (3 and 4) identify the program number, which specifies the address of the program in the memory. In normal operation this may be any number from 10 to 022. Following the program number, as many as 16 four-column instructions may be coded in the next 64 columns. A code signaling the "end-of-program" is punched in the column following the last instruction. The remaining columns on the card are not used for instruction data but may be used by the operator for such things as card identification, job number, program code, and the like.

Figure 2A:
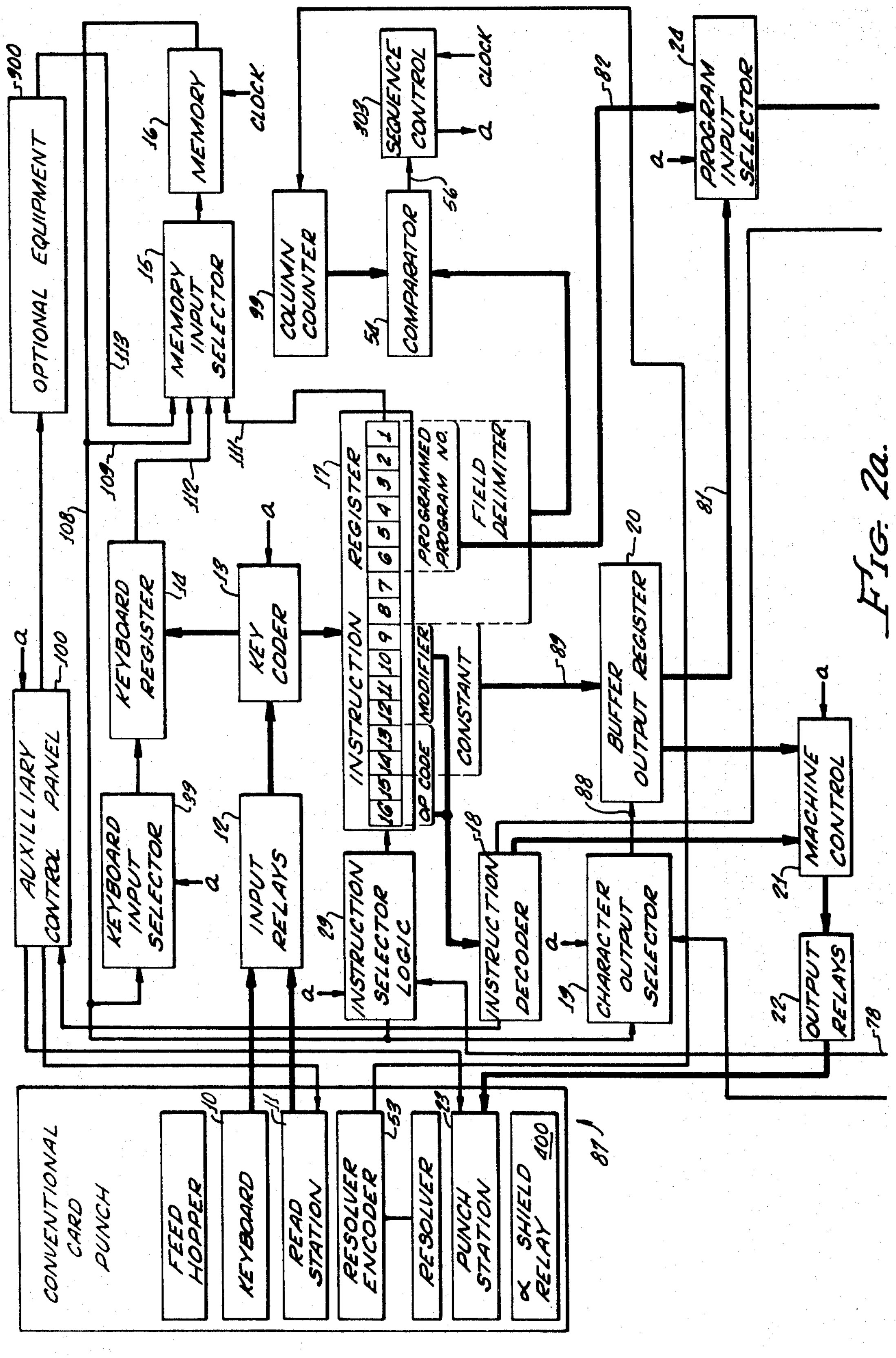
FIGS. 2*a* and 2*b* show the functional relationship of a preferred group of operative elements for performing the various processes of the invention.
Figure 2B:
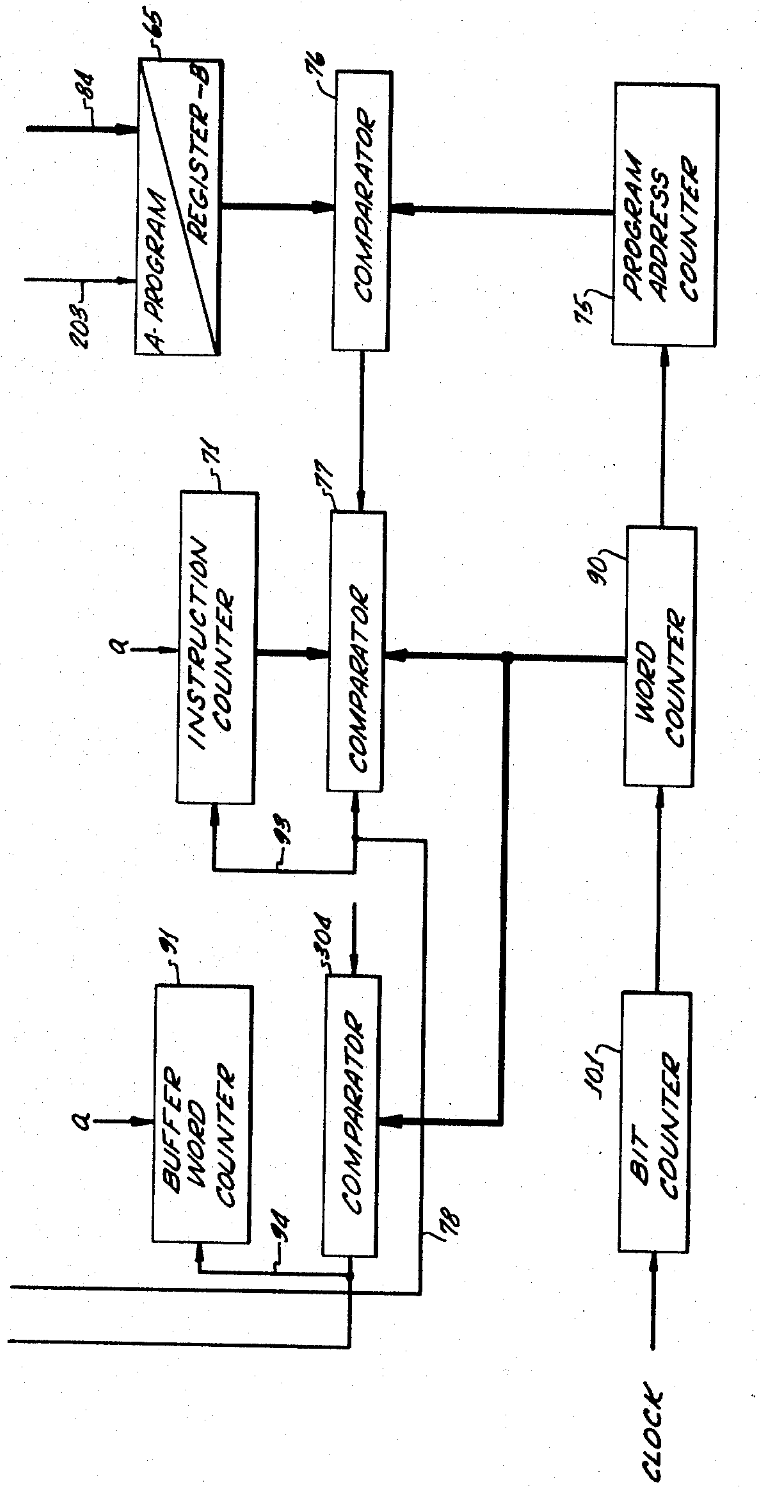

FIG. 2 shows the interrelationship of the various operative elements comprising a preferred embodiment of an apparatus for practicing the invention. The functional aspect of each element may be delineated as follows.

Keyboard 10. The keyboard 10 is a standard part of a card punch machine. Each key mechanically closes an electrical contact. In the present invention the keyboard 10 functions in a dual mode: (1) as originally intended as a means for entering alphanumeric data on a batch of cards which are punched in accordance with the particular keystroke (see the description for executing a manual field operation); and (2) in a new capacity to select a desired program stored in memory, or to erase data in the buffer, or to enter special operating modes.

Read Station 11. The read station 11 is also part of a standard card punch machine. The read station comprises a set of mechanical fingers or photocells for determining the presence or absence of a hole (i.e. a punch) at a particular location on the card being read.

Input Relays 12. The input relays 12 function to provide isolation between the conventional card punch machine and the other elements of the system. Signals from the keyboard 10 and read station 11 use corresponding input lines so that the input relays 12 are logically responsive to either.

Keycoder 13. The keycoder 13 operates on the signals received from the input relays to encode the signals from either input 10 or 11. For example, if the operator keys the letter J or the numeral 4, both of which are on the same key, two similar sequences load both characters into memory in a 16-bit word: first, an 8-bit coded representation of the letter J (alpha shift) goes into the keyboard register 14, which transfers it into the memory 16; second, an 8-bit, binary-coded-decimal representation of the numeral 4 (numeric shift) goes into the keyboard register 14, which transfers it into the memory 16. If however the operator is reading in programs, data from the read station 11 is transferred (via the input relays 12) to the keycoder 13 where the information is decoded and the appropriate signals for loading this data into the instruction register 17 are generated. Information is loaded into the instruction register 17 only when the operator is reading in programs.

Keyboard Input Selector 39. The keyboard input selector 39 closes the loop to enter keyboard register data into the memory 16. Synchronization of the keyboard input selector with the memory is accomplished by the sequence control unit 303 to be described below.

Keyboard Register 14. The keyboard register 14 is an 8-bit flip-flop shift register. Information is entered in parallel and shifted out serially.

Memory Input Selector 15. The memory input selector 15 operates to circular data in the dynamic memory 16 (path 109) or to enter new information into the memory 16 from either the keyboard register 14 (path 112) or the instruction register 17 (path 111) or the optional equipment 900 (path 113).

Dynamic Memory 16. The memory 16 is a 6144 bit MOS shift register. A pictorial drawing illustrating the organization of the memory and its relation to the program card format is shown in FIG. 1. In one part of the memory called the "buffer" only characters are stored. This buffer part is capable of storing the alpha and numeric code for 31 characters having 16 bits each. The remaining part of the memory is used to store up to 22 programs, each of which may have as many as 16 instructions. Each instruction is 16 bits. The buffer part of the memory allows the operator to actuate the punch station from the keyboard as would be the case in a standard IBM card punch machine if it were not interconnected with the elements which comprise the present invention. Because the elements of the present invention are interposed between the keyboard 10 and the punch station 23, it is necessary to restore the capability of punching a regular character from the keyboard. In the present invention, this function is accomplished as follows. When the operator depresses a particular key (e.g. J/4) which corresponds to the desired character, the buffer part of the memory is encoded via the keycoder 13 and keyboard register 14 with both the alpha (J) and numeric (4) representations of the key. Each requires 8 bits, so that together a full 16-bit character is generated. When the dynamic memory has circulated to the point where the desired character is located, the character is "read out" as indicated by the paths 108 and 87.

Character Output Selector 19. The character output selector 19 determines whether the first 8 bits (if the keyboard is enabled in the alpha shift mode) or the last 8 bits (numeric shift mode) will be transferred to the buffer output register 20 (path 88). Either the alpha or numeric character is then punched depending upon the contents of the buffer output register 20, this operation being implemented by the machine control 21, output relays 22 and punch station 23, a brief description of the essential features of each being discussed below. The timing for synchronizing the character output selector with respect to the other operative elements is accomplished by the sequence control unit 303.

Instruction Register 17. The instruction register 17 is a 16-bit flip-flop register, serial or parallel input, serial shift output. The instruction register 17 communicates with other elements in various ways, depending upon the type of instruction. A list of the instructions are tabulated in FIG. 4. For example, the four high order bits (bits 16 through 13) may be used to specify the operation code with the next 4 bits (12-9) functioning as modifier and the remaining 8 bits specifying the last column of the card in which an instruction is to be effective (i.e., the length of the field). In other cases the low order bits of an instruction may be used to specify various codes for operating certain optional equipment to be described below. In the case where an instruction calls for a character to be punched from memory, the two high order bits (16 and 15) only are used to specify the operation code, and the next six bits (14-9) are used to specify the particular constant, with the remaining bits (8-1) specifying the end-of-field column number, i.e., the last column in which the instruction is to be executed. An instruction is held in the instruction register while the instruction is being executed. This is accomplished by the instruction select logic 29.

Instruction Decoder 18. The instruction decoder 18 generates a signal on one of ten lines in accordance with the state of instruction register bits 16-13. If the code for a constant (i.e. bits 16 and 15 both binary "1") is detected, the contents of instruction register bits 14-9 are transferred to the buffer output register 20.

Buffer Output Register 20. The buffer output register 20 is an 8-bit register capable of receiving information in serial (path 88) or parallel (path 89) and outputting in parallel.

Machine Control 21. The machine control 21 is used to drive interposers at the punch station 23 via the output relays 22. Thus, if the instruction is identified by the operation code as a machine instruction (see FIG. 4) those bits of the instruction which determine what is to be punched are transferred from the buffer output register to the machine control 21 where the proper signals for actuating the punch station 23 are generated. Sync with other elements is maintained by the sequence control 303.

Program Input Selector 24. A program may be selected in either one of two different ways. The program input selector 24 determines whether the program registers 65 are loaded with the contents of the buffer output register 20 or with a program number specified by the last 6 bits of an instruction. A binary coded decimal format is used to specify any one of the 22 possible programs with the four low order binary bits (1–4) encoding the least significant decimal digit of the program number (0–9) and the high order binary bits (5 and 6) encoding the most significant decimal digit (0, 1 or 2). If the instruction register 17 contains a jump instruction (see FIG. 4) the last 6 bits encode the number of the program to which the jump is to be made. The program input selector 24 will then transfer this information (via path 84) to the program registers 65 and the first instruction of that program will be taken as the next instruction which is loaded into the instruction register 17. (The manner in which the instruction is found is discussed below in connection with various counters.) If the operator selects the program manually, the keyboard 10 is enabled in numeric shift and the two keys which identify the program number are depressed in succession. This information is transferred via the keyboard register 14 to the memory 16 and then to the buffer and output register 20 as indicated by the paths 87 and 88. The program input selector 24 then transfers the keyed in program number to the program registers 65 as is indicated by the paths 81 and 84.

Program Registers 65. The program registers 65 comprise two separate 6-bit registers A and B. A program may be selected either automatically or manually. In either case, the program number is loaded into register A. Before execution is initiated, this number is also copied into register B where it is retained until completely and correctly punched. If the operator, during the punching operation, makes an error, the error reset and release key on the card punch machine can be used to "skip out" the ruined card. Further jumps to subsequent programs are prohibited, and the program which was in effect at column 1 of the program card (namely, the program whose number is stored in register 13) is once again put into effect. The operator may use the dup key to reproduce the information up to the field at which the error occured. The operator may then key in the correction and continue.

Counters 101, 90 and 75. A particular address in memory is located by a series of counters which are incremented in sync with the memory 16. The state of the various counters are compared with the contents of the various registers to determine the location (in a time sense) of each piece of stored data as follows: the clock (500 KHZ) is first divided by a mod (16) bit counter 101. This in turn is divided by a mod (16) word counter 90 and the output signal from the mod (16) word counter 90 is further divided by a mod (24) BCD program counter 75. If the program registers 65 contain a number (01–22) the comparator 76 will generate a signal to indicate that the information of this address is accessible at the output 108 of the memory 16, when the contents of the program register 65 and the program counter 75 are identical. This signal enables comparator 77, and the contents of the word counter 90 and the instruction counter 71 are compared so that the shifting of information in the instruction register 17 may be resumed. To be more explicit, the instruction select logic 29 normally inhibits the serial shift of data through the instruction register 17. When the program compare signal is generated, the instruction counter 71 will be at zero for the first instruction in the program, a comparison will occur immediately so as to generate an instruction compare signal on line 78. This also increments the instruction counter 71 one count (via path 93) so that the second instruction will compare, etc.

It was previously mentioned that the operator may punch a particular character or function, such as dup, skip and the like, from the keyboard in which case the buffer part of the memory 16 is used. If the operator executes this operation when the buffer is empty, the data corresponding to first character to be punched is stored in the first of the 31 word locations in the buffer part of the memory. This causes the buffer word counter 91 to advance one count. When a character is to be outputted from the buffer, the buffer word counter 91 is decremented one count, and when the count in the buffer word counter 91 is the same as the contents of the word counter 90, a buffer compare signal is generated and the character is shifted into the output buffer register. At this point the character is no longer available in the memory 16. The same result would follow if there were other characters stored in the buffer part of the memory, that is, the buffer counter 81 is decremented one count just before a character is brought out and a new location for storage is available in the memory. The characters are, of course, always withdrawn from the buffer part of the memory in the same order in which they are entered.

Instruction Select Logic 29. As described in connection with the instruction formats shown in FIG. 4, the last 8 bits of the machine instruction are used as a field delimiter, i.e., these bits specify the last column of an instruction in which a particular operation is to be performed. While such a field instruction is being carried out, it is necessary to hold the data in the instruction register 17. This is accomplished by the instruction select logic 29 which inhibits the serial shifting of the instruction register 17 (even though comparison signals are generated on line 78) until a signal is received from the sequence control 303. The sequence control 303 is responsive to a signal 56 which is generated whenever the number of columns (up to 80) represented by the contents of the column counter 99 is equal to the number of columns specified by the field delimiter portion of the instruction (bits 1–8). The columns are counted by a resolver encoder 53 which is physically attached to the shaft of the escapement wheel on the standard keypunch machine. The resolver counts up of the card is advancing and counts down if the operator backspaces a card.

Sequence Control 303. The sequence control 303 functions to monitor the status of signals from other function groups and gate control signals to effect the following operational routines: read program; select program; execute program; buffer keystrokes. The sequence associated with each of these functions will be considered separately as follows:

Read Sequence.

Clear the program register 65

Energize dup and field-definition relays in the card punch to connect sense-pin circuits at the read station 11 to the input relays 12 and operate the escapement that advances the program cards through the read station 11.

Strobe a character from the keycoder 13 into the instruction register 17 as each card column is sampled during the escapement cycle.

Clear the instruction counter 71 and transfer the third and fourth characters, which are two binary-coded-decimal digits, to the program register 65. These digits identify a particular program and assign it to a corresponding address, which is a time slot in the memory 16.

Strobe the next four characters into the instruction register 17, shift the contents of the register into the memory 16, and increment the instruction counter 71. Repeat this step for each instruction of the indicated program.

Skip the remaining card columns by energizing the skip relay in the card punch machine at the end of each program, and repeat all the above steps until a blank column that is not the second column of a constant instruction is detected by the instruction decoder 18.

Figure 6:
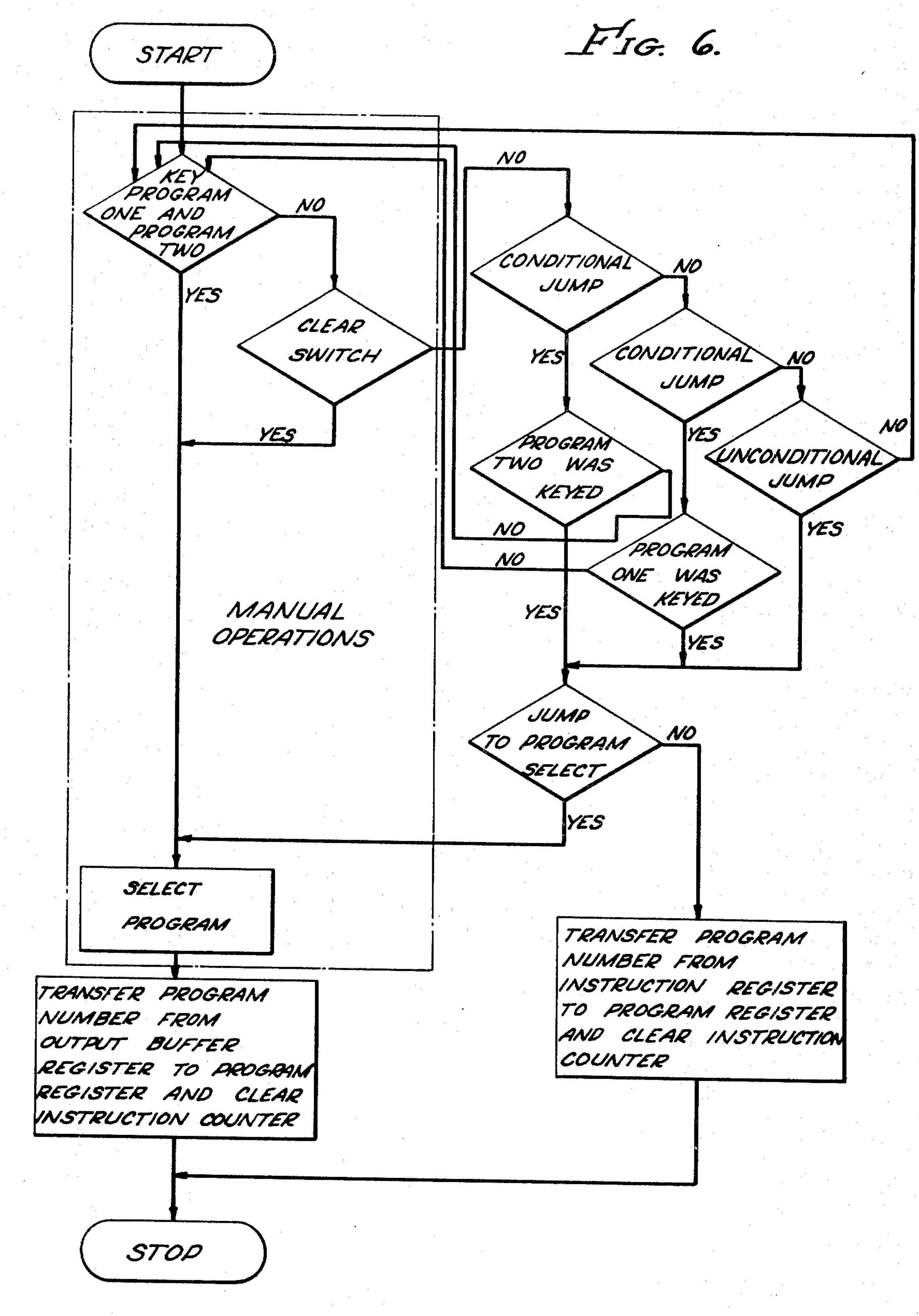
FIG. 6 is a flow chart illustrating the decision paths in program selection.

Select Program Sequence. Program selection consists in loading a new program number manually or automatically into the program register. Loading the program register also clears the instruction counter. The program-selection sequence automatically selects a new program by executing a jump instruction that includes a program number. The operator manually selects a program by keying the 2-digit program number when the system is in the select-program state (SELECT PROG light is on). The sequence control then functions to transfer automatically selected program numbers from the instruction register to the program register 65, and to transfer manually selected program numbers from the buffer output register 20 to the program register 65. A flowchart illustrating the decision paths in program selection is shown in FIG. 6.

Execute Program Sequence. The operator initiates the program control sequence by manually selecting a program, keying first the tens digit and then the units digit. Each keying operation triggers a control sequence that transfers a digit to the buffer output register 20. The program input selector 24 then transfers the digits one at a time to the program register 65. The sequence control 303 starts an instruction fetch cycle at the end of the program-select sequence. The instruction fetch cycle consists in finding the instruction in memory 16 that corresponds to the program number and the instruction counter 71, shifting that instruction into the instruction register 17, incrementing the instruction counter 71 in preparation for the next fetch cycle, and waiting until the instruction is executed before completing the cycle. The comparator 76 compares the state of the program address counter 75 with the number in the program register 65. When these two are equal, the designated program is available at the memory output 108, and the program compare signal enables the comparator 77 to compare the word count with the instruction count, which was reset to zero when the program register 65 was loaded. An instruction compare signal 78 then enables the instruction select logic 29 to gate the first word of the program into the instruction register 17. The end of the instruction compare signal increments the instruction counter 71, and sequence control 303 indicates that the instruction is ready. A next instruction request from the sequence control starts another fetch cycle. The instruction decoder 18 examines the operation code and its modifier to determine what the instruction is and whether it is an auxiliary instruction, which takes only one clock period, or a machine instruction, which remains in effect until the field delimiter compares with the column count (comparator 54) to generate an end-of-field signal 56. The end of that compare signal or the clock pulse following an auxiliary instruction indicates that the instruction is finished, which enables a next-instruction request to start another fetch cycle unless a jump instruction initiated a program-select routine. A decoded machine instruction gates the machine control 21 to operate the card punch machine through the output relays 22. For a constant output, the buffer output register 20 transfers the constant from the instruction register 17 to the machine control 21, to drive the proper interposers in the card punch through the output relays 22.

Buffer Keystrokes Sequence. This routine comprises a buffer load sequence and a buffer unload sequence. The buffer load sequence occurs whenever the operator keys a character on the keyboard 10. The buffer unload sequence occurs whenever the sequence control 303 requires a keyboard output for punching, selecting a program, or executing an instruction that is not automatic (i.e. a manual-field or left-zero-field instruction). The buffer part of the memory 16 stores both the alpha character and the numeric character from a signle keystroke since the choice between these two is made by the output instruction, which may not be in effect at the time the character is keyed. The buffer load sequence operates independently of any automatic instruction. It starts when the sequence control detects a keystroke. The input relays 12 then transfer the alphashift key signals to the keycoder 13, which encodes the character in an 8-bit byte. The sequence control strobes that byte into the keyboard register 14 enables the keyboard input selector 39 and memory input selector 15 to connect the keyboard register 14 in series with the memory 16 to shift the alpha character into the buffer part of the memory 16. The sequence control 303 then strobes the numeric character into the keyboard register 14, shifts it into memory during the next buffer period, and increments the buffer word counter 91. The buffer unload sequence starts when the card being punched is in a manual or left-zero-field. The sequence control 303 decrements the buffer word counter 91. A comparator 304, enabled during the buffer period by program counts 23 and 00, compares the buffer word counter 91 with the word counter 90. When the two counts are the same, a buffer compare signal 94 gates the 16-bit word from the memory output 108 into the character output selector 19. The sequence control 303 transfers to the buffer output register 20 the first or second byte, depending on whether the shift defined for the current field is numeric or alpha. The sequence control 303 then transfers the selected byte to the machine control 21, which decodes the buffer output register 20 to drive appropriate card-punch interposers through the output relays 22.

Auxiliary Control Panel 100. The auxiliary control panel 100 in addition to the power switch and power indicator light includes an error indicator light, a program select indicator light, a "reader on" switch, and a reader on light. The indicator lights are actuated by signals from the sequence control 303 and instruction decoder 18, the primary purpose being to inform the operator of various conditions which may occur during operation of the machine. The "reader switch" is used by the operator to load programs into memory.

Optional Equipment 400.

Light Option. The light option controls a projection device (actuated by an auxiliary instruction) which displays instructions for the operator in program sequence to remind the operator of certain things. The information remains visible until the corresponding machine instruction is completed.

Left Zero Option. The left zero option automatically right justifies numeric data which the operator enters through the keyboard (see description of the instruction below). The auxiliary equipment for this function consists of an additional plug-in circuit board which operates in response to a signal from the instruction decoder 18 to right shift the numerical data and fill the left portion of the field with zeros.

Accumulator Option. The accumulator option comprises additional plug-in elements which enable the operator to total the contents of two different left zero fields. Program address 22 in the memory stores the accumulated number when the accumulator option is used, in which case the operator can store only 21 programs. The additional elements include the logic for the addition, and memory address 22 provides the storage for one or two accumulated totals. The interconnection loop is indicated by the path 113 shown in FIG. 2. The accumulator option requires that the system must also include a left zero option.

The operator can either punch the field or depress the dup key (if the card has the same field as the prior card) on the card punch machine. The instruction then executes the accumulation automatically.

Figure 4:
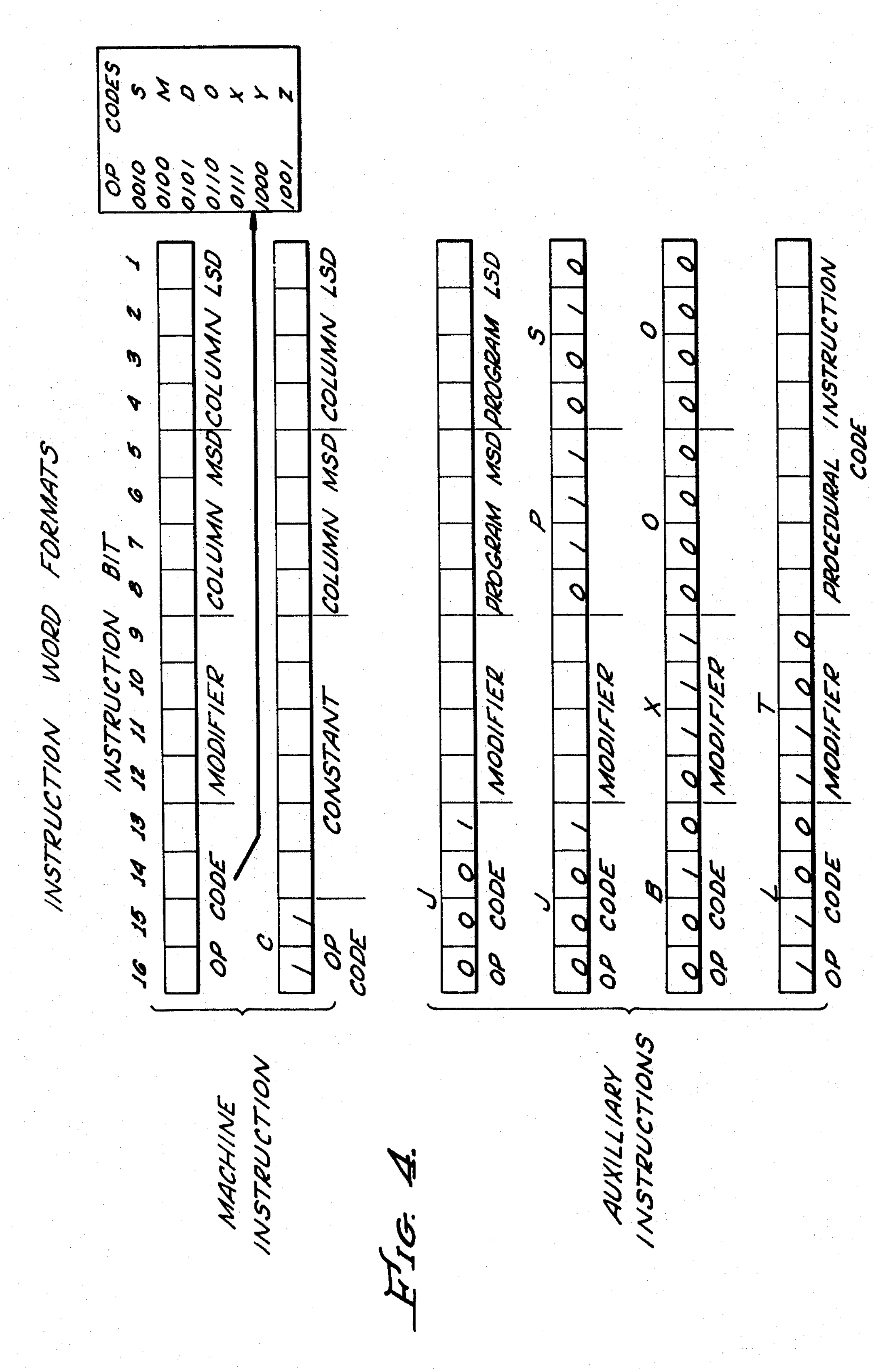
FIG. 4 shows the format for the various program instructions.

Machine Capabilities. The instruction decoder 18 is responsive to the instruction set tabulated in FIG. 3. The corresponding word formats for each of these instructions is shown in FIG. 4. A brief description of the instructions is as follows:

Constant. The constant instruction punches a character from memory. The first column of the instruction contains the letter C. The second column contains the character including a space. The third and fourth columns contain the end-of-field column number. This instruction punches the constant character in each column up to and including the end-of-field column. The constant instruction is stored in the instruction register with bits 9–14 of the instruction register defining the constant to be punched. The code for the character to be punched is loaded in the buffer output register and the character is punched the same way that a buffered character would be.

Skip. The skip instruction automatically skips card columns to a designated column. The first column of the instruction contains the letter S. The second column contains the letter A or N, for alpha or numeric shift. The third and fourth columns contain the end-of-field column number.

Dup. The dup instruction automatically duplicates a card at the read station to a designated column. The first column of the instruction contains the letter D. The second column contains the latter A or N, for alpha or numeric shift. The third and fourth columns contain the end-of-field column number.

Manual. The manual instruction defines a field in which the operator manually keys data to be punched. Since the keystrokes are buffered by the memory, the operator need not wait for the manual field. The first column of the instruction contains the letter M. The second column contains the letter A or N, for alpha or numeric shift. The third and fourth columns contain the end-of-field column number.

Buffer Check. The buffer check instruction checks to determine whether the buffer is empty. If the buffer is not empty, the check fails, and this instruction clears the buffer and locks the keyboard until the end of card or until the operator keys PROG ONE and PROG TWO on the keyboard. The first column of this instruction contains the letter B. The second column contains the letter X. The third and fourth columns contain zeros.

Jump. The jump instruction terminatea a program by selecting another program automatically or by interrupting all key-punching sequences until the operator selects another program. The first column of this instruction contains the letter J. The second column of the instruction contains the numeral 0 for an unconditional jump, 1 for a first alternate jump, or 2 for a second alternate jump. The alternate jumps are conditional. A first or second alternate jump will be executed if the operator presses the PROG ONE or PROG TWO key before the corresponding instruction is processed. The third and fourth columns of the jump instruction contain either the program number of the program to be automatically selected or the letters PS to indicate that the operator is to make the program selection. After a jump-to-program-select instruction is executed, the SELECT PROG indicator (on the punch machine) lights, and the operator selects the next program by keying a 2-digit program number. The operator can manually simulate the jump-to-program select instruction at any time by pressing both the PROG ONE and PROG TWO keys. The last executed instruction of any program must be a jump instruction, and the last programmed instruction must be an unconditional jump.

Left Zero Fill. The left-zero-fill instruction right justifies keyed numerical data in a designated field of three to 12 columns and fills the remaining columns of the field with zeros. The first column of the instruction contains the letter Z. The second column contains the field size, which is designated by the units digit of the number of columns in the field. The third and fourth columns contain the end-of-field column number. The keyed data is not punched until the operator hits the left zero key. If the operator had mistakenly punched too many columns (overpunched the field) the data would not be punched, rather the error light lights.

Accumulate in X or Accumulate in Y. The accumulate instruction right justifies a keyed number in a designated field of three to 12 columns, fills the remaining columns of the field with zeros, and adds the number in that field to the total accumulated from prior cards by program instruction.

Output. The output instruction punches the 16-digit contents of a designated accumulator into a batch-total card. The first column of the instruction contains the letter O. The second columns contains the letter X or Y, designating the accumulator from which the total is to be punched. The third and fourth columns contain the end-of-field column number, which must allow a field of 16 columns.

Light. The light instruction displays one or more procedural instructions for the operator. The first column of the program instruction contains the letter L. The second column contains the letter T. The remaining two columns specify which instruction.

Figure 5:
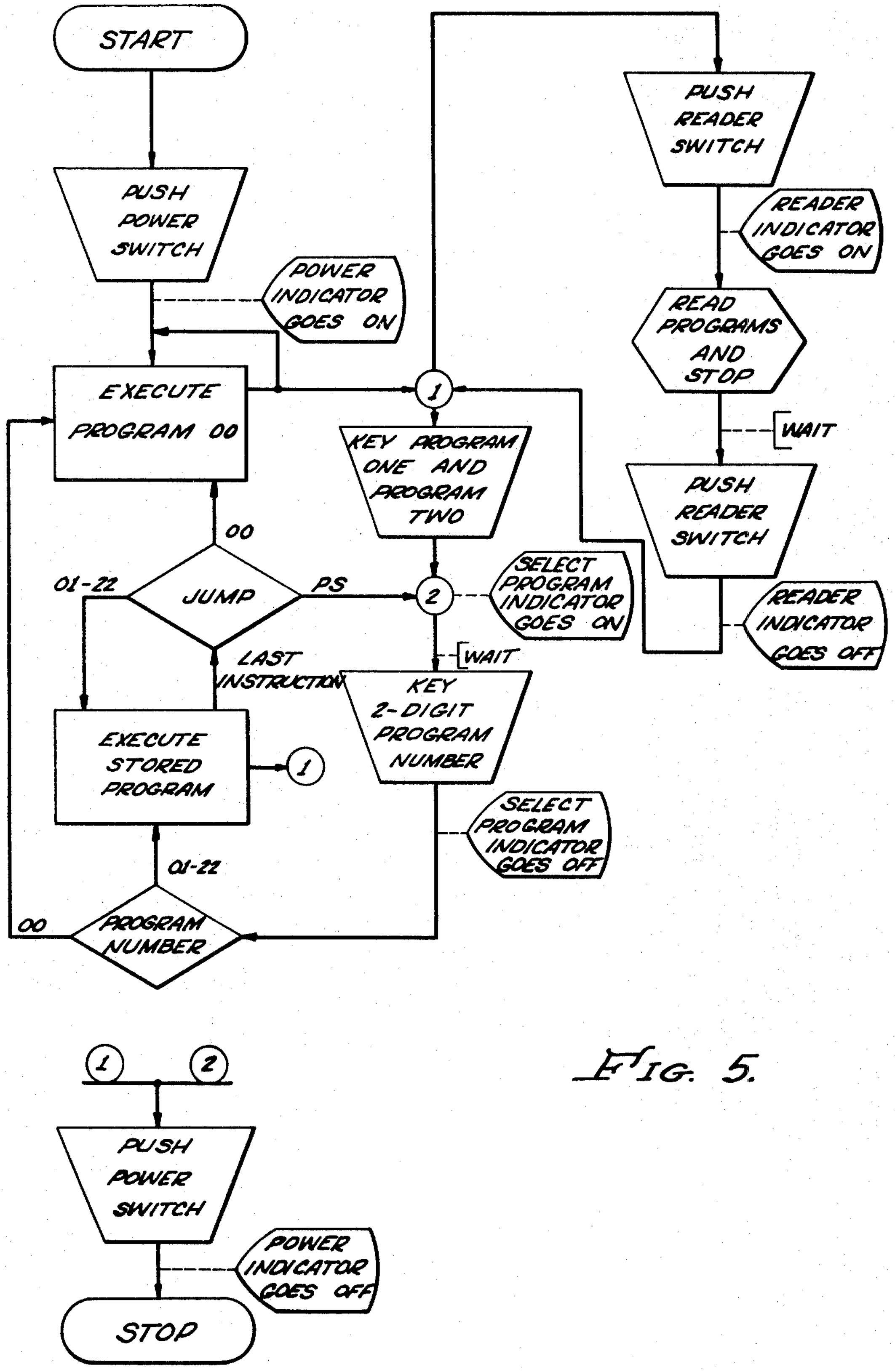
FIG. 5 shows an operational flowchart of the various operative states which the apparatus may assume.

Operation. FIG. 5 shows the various situations which the operator and system may assume during normal operation. The most significant of these from the system standpoint are (1) reading the programs into memory, and (2) operating under program control. In order to clarify the advantages of the present invention in relation to prior art, a discussion of each operation will be undertaken.

Reading Programs into Memory. In conventional card punch machines, the operator must first make a program card. Often as a matter of convenience the operator would run the card through the punch station several times to transfer the necessary information to the card. The program drum must then be removed from the machine and the old program card replaced by the new program card. The operator must then replace the drum. This process must be carried out each time a different program (other than one of the two that are stored on the program drum) is desired.

In the present invention, as many as 22 programs can be loaded into memory as follows. The operator places a deck of program cards and a "trailer card" into the feed hopper 38 of the card punch. As each card is registered at the read station 11 it is read into the memory 16 by pressing the reader "ON" switch on the auxiliary control panel 100. When information is being loaded, all functions other than read are inhibited. Instructions are sequentially read into memory, one at a time, until an end of program code following the last instruction of a program is detected. The remaining columns of the card are skipped over and the next card in the program deck is automatically transferred to the read station 11. The reading and skipping continues until any card having a blank in columns one and two is detected. This trailer card is used by the operator to halt the reading process. The only other way in which the reading process will stop is if an error occurs (e.g. a blank in some instruction or a blank column prior to reading an end of program code) in which case the reading operation terminates and an error light on the control panel 100 is energized.

If, after loading a series of programs, the operator desired to change a particular program which has been read into memory, it can be conveniently done by pressing the read switch after manually registering the new program card at the read station 11 (or dropping it into the hopper for automatic registration at the read station).

During the loading process, the operative elements of the system are performing as follows. Information from the read station enters via the input relays 12 to keycoder 13 and then is transferred to the instruction register 17 from which it is serially transferred to occupy the proper address in memory according to the program number (see FIG. 2). This information is loaded into memory when the program address counter 75 compares with the number stored in the program register 65 as previously described. Whenever the end-of-program signal is detected, the program register 65 is cleared (line 203) in readiness for the next program card which may be any number (not necessarily the next consecutive number).

Program Control. After a program has been loaded, the operator may select a program in various ways as indicated in FIG. 5. Programs are selected either by the operator or by programmed jump instructions. When the select-program (SELECT PROG) indicator lights, it indicates that the system is waiting for the operator to select the next program. This situation occurs when the operator presses PROG ONE and PROG TWO keys or when a jump-to-program-select instruction has been executed. The operator selects a program (which turns off the select-program indicator) by keying a 2-digit program number.

Program 00 is a built-in program which puts the system under manual control when (1) the operator applies power by pressing the power on switch on the auxiliary control panel 100, (2) the operator selects program 00, or (3) a jump to program 00 instruction is executed.

Under stored program control, the card punch is controlled to execute programmed instructions. Data is transferred from the buffer part of the memory 16 to the card punch machine during a manual-field instruction. The operator can key data into the buffer at any time without waiting for a skip, dup, or constant field operation to be completed. Data can also be keyed while a card is being registered. Succeeding programs may be selected automatically by jump instructions.

In order to understand how the operative elements of the system behave under program control, several specific examples will be considered. If a program is being executed the instructions are being transferred from the memory 16 in sequence, with the sequence control 303 commanding the next instruction as each one is executed. (Whenever a compare occurs, the instruction counter 71 is advanced one count [line 93] and the instruction select logic 29 is signaled to shift the instruction into the instruction register 17.) If the instruction is an automatic instruction (SKIP, DUP or PUNCH A CONSTANT) bits 8–1 are compared with the contents of the column counter to determine whether the instruction has been executed in accordance with the length of the field. The instruction decoder 18 signals the machine control 21 to actuate the output relays 22 to cause the card punch to execute the instruction. If it is a skip instruction, a relay in the card punch is pulled until a comparison (line 56) is generated, at which time the sequence control 303 stops the operation. If the instruction is a "dup instruction," relays are pulled in the card punch to transfer the signals from the sense pins at the read station 11 to the punch mechanism 23. For the constant instruction, the character coded by the instruction is transferred to the buffer output register (path 89) exactly as if it came from memory via path 87 and 88. The card punch is caused by the machine control 21 to continue to punch this character until a compare is generated (line 56) at which time the sequence control 303 interrupts the operation.

If the instruction is a manual one (manual field or left zero fill) the instruction decoder 18 in the former case, looks at the next letter (the modifier which indicates either alpha or numeric data) to determine whether to pull the alpha shift relay 400 in the card punch. When data is keyed in it enters through the keyboard register 14 into the buffer part of the memory 16 and is transferred via the character output selector 19 to the buffer output register 20 as previously described. The information in the buffer output register 20 is then used to punch the proper character via the machine control 21 and output relays 22. Of course, the operator does not have to wait to key in the data for the manual instruction, this being an important feature of the system as previously described. For example, if the operator first has a number of automatic instructions in a program followed by a number of manual instructions, data may be keyed-in for the manual instruction while the system is carrying out the automatic instructions. The operator must, of course, make sure that the data for the manual instruction is keyed in proper sequence so that the manual field data correlates with the proper instruction. Where the instruction is a left zero fill, the operator first keys in either data or a function, such as skip, dup, etc. If data is keyed, the operator then punches the left zero button on the keyboard 10. The keyed in data enters the buffer part of the memory 16 and is then transferred to the buffer output register 20 as described above. When the instruction is executed, the buffer counter 91 is decremented to vacate a word in the memory.

It will be evident from the description of the preferred embodiment of the invention that numerous other embodiments exist for effecting the same results. In addition, there are ways for modifying standard card punch equipment to achieve some of the capabilities of the preferred embodiment. For example, special and auxiliary codes may be added to the standard card punch program card to carry out certain functions. If a memory only is added, the device may be used to buffer keystrokes, etc. It will also be recognized that the present system is applicable to varification. When used in combination with a standard card punch verifying machine, the present system allows the operator to check manual operations while skipping past the automatic operations.

Thus, although a particular method and system for reducing card punching time and errors has been shown and illustrated, it will be understood that the invention is not limited thereto, and that numerous changes, modifications and substitutions may be made without departing from the spirit of the invention.

We claim:

1. A method for punching cards comprising the steps of:

reading in program cards for storage in a memory;
selecting a desired card punch program;
entering keys-roke data for carrying out certain program instructions while other instructions are being executed;
storing the keystroke data in the chronology in which it is entered.

2. The method recited in claim 1 wherein is included the steps of:

retrieving the keystroke data so that it can be utilized to execute the instruction to which it applies; and
making available in address in memory when a word of keystroke data has been utilized.

3. The method recited in claim 2 wherein is included the steps of:

punching a constant which is identified by the contents of a particular instruction stored in said memory.

* * * * *